Nov. 10, 1970  H. PRADEL  3,538,719
METHOD FOR MAKING THE SUBSTRUCTURE OF AN ICE-SKATING RINK
Filed May 31, 1967

United States Patent Office 3,538,719
Patented Nov. 10, 1970

1

3,538,719
METHOD FOR MAKING THE SUBSTRUCTURE
OF AN ICE-SKATING RINK
Henri Pradel, 19 Rue des Allies, Pau, France
Filed May 31, 1967, Ser. No. 642,456
Claims priority, application France, June 15, 1966,
66,368
Int. Cl. A63c 19/10
U.S. Cl. 62—235                                              4 Claims

ABSTRACT OF THE DISCLOSURE

A substructure of an ice-skating rink comprises a corrugated plate of glass-resin laminate covered by and bonded to a flat plate also made of glass-resin laminate to form refrigerant passages between the plates for circulating a refrigerant, the corrugated plate resting on a conforming sub-base of polyurethane foam.

The present invention relates to the making of an ice-skating rink, which may be produced at reduced cost while giving a better performance than the known methods.

The method of the invention is based on the ability of certain plastic materials to be formed and assembled, whatever may be the thickness required for the work, while being adapted to be used readily by unskilled workers without using any intricate and costly tools and implements.

The method of the invention makes it possible for the ice to be produced very quickly, within about three hours, whereas with conventional plants made of metal tube nests it takes at least about twenty four hours. Furthermore, the layer of ice produced is very even and more homogeneous, especially when the rink is set in the open air. Additionally, the usual metal lines with their unions, welds and threadings are dispensed with.

The method of the invention consists in constituting the substructure of an ice-skating rink by a corrugated plate of glass-resin laminate, which plate is covered by a flat plate also made of glass-resin laminate, that side of said flat plate positioned against the corrugations in the first-mentioned plate being bonded to the crests of said corrugations, so as to form channels which are used for circulating the cold-producing fluid.

Figure 1:
Figure 2:
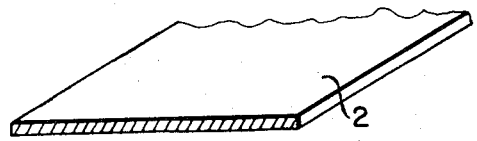
Figure 6:
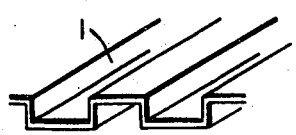
Figure 3:
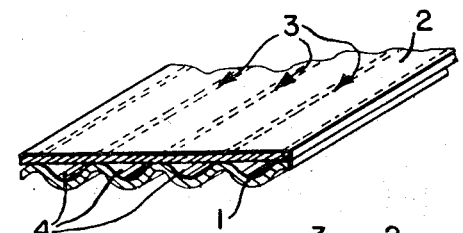
Figure 7:
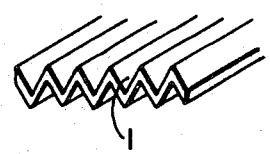
Figure 4:
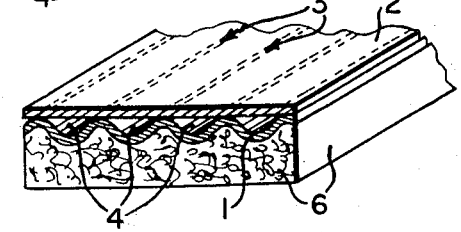
Figure 5:
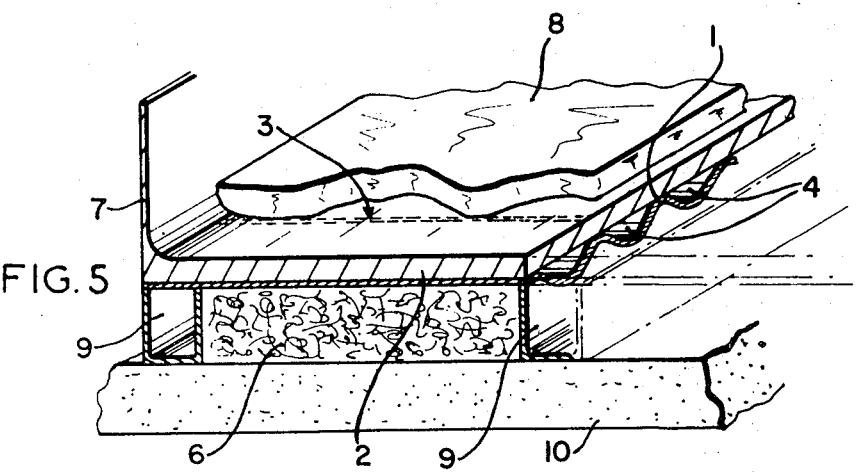

These and other advantages and features of the invention will appear from the following description, with reference to the appended drawing which illustrates, by way of example, an embodiment of the invention. In said drawing:

FIG. 1 shows a section of a corrugated plate;
FIG. 2 shows a section of a flat covering plate;
FIG. 3 shows the plate of FIG. 1 and the plate of FIG. 2 assembled together to form a member;
FIG. 4 shows the member of FIG. 3 associated with a sub-base;
FIG. 5 is a figure similar to FIG. 4, showing in addition a framing member and the manifold system;
FIGS. 6 and 7 show two modified shapes of corrugations.

According to the method of the invention, on the one hand, corrugated plates 1, as shown in FIG. 1, and, on the other hand, flat plates 2, as shown in FIG. 2, are manufactured from glass-resin laminate.

A plate 2 is then laid over a plate 1, as shown in FIG. 3, and said two plates are assembled together by continuous bonding or cementing lines 3 at right angles with the corrugation tops in plate 1, whereby channels 4 are formed at the lower portion of the assembly.

2

After assembling and interconnecting side by side a number of such units over an area corresponding to that required, a monolithic structure is obtained, the channels 4 of which are used directly for circulating a cold-producing fluid.

According to a preferred embodiment of such units for constituting an ice-skating rink, said units are each associated with a sub-base 6 made of a rigid foam of synthetic resin such as, for instance, polyurethane, which is directly molded onto the lower side of the corrugated plate 1, as shown in FIG. 4.

Furthermore, those plates 2 which are located at the edges of the rink are each provided with a flange 7 normal to the direction of the corrugations in plates 1, which flanges form a casing adapted to hold the water to be frozen which is poured therein to produce the ice layer 8, as shown in FIG. 5.

A system of manifolds 9, manufactured according to the same methods and from the same materials, is provided for the admission of cold-producing fluid into the channels 4 and the return of said fluid to evaporators.

The upper flat plate 2 may be surmounted by one or more other flat plates, also made of glass-resin laminate, so as to increase the thickness thereof.

The structure achieved by the method of the invention, which includes both the rink and the line network, allows obtaining a very quick freezing of water with a minimum loss of refrigerating energy, owing to the nature of said structure and of the very large area of contact with the cold-producing fluid. Furthermore, said structure is indifferent to thermal effects and ageing, and replaces advantageously the conventional thick concrete slab incorporating a network of metal lines.

The supply of cold-producing fluid and the operating procedure are those used in conventional plants and need not be described in further detail.

Furthermore, the maintenance of the rink according to the invention is easy, and repairs thereto are readily made by means of the same materials and means as those used for manufacturing said rink.

The component parts of the rink of the invention may be produced by any process whatever, and the following is given merely by way of example:

To produce a corrugated plate 1, a form provided with a corrugated bottom is laid flat, said bottom being then covered with a glass fiber cloth which is made to conform to the hollows and ridges of the corrugations in said bottom. Said cloth is then impregnated with a liquid resin or a liquid acting in the same way.

To produce the sub-base 6, a cellular material containing a known expansion agent is poured into the mold constituted by the plate 1 produced as described hereinabove. The material is allowed to set, after which the stripping takes place.

To produce a flat plate 2, a piece of glass fiber cloth is spread out on a flat surface and stiffened through impregnation with a resin of the same nature.

It should be noted that the thickness of the sub-base 6 improves the insulation and inertia characteristics of the substructure, while, on the other hand, the products used are unaffected by any acids and bases.

The finished structure, which is light, is advantageously laid on a bed of sand 10.

The cross-section of the corrugations in plates 1 is not necessarily that shown in FIGS. 1 to 5; as a matter of fact, it may be of any type, such as, for instance, one of those shown in FIGS. 6 and 7.

According to the provisions of the patent statutes, I have explained the principle of my invention and have described what I now consider to represent its best embodiment. However, I desire to have it understood that

What I claim is:

1. A method comprising forming a sinuous, corrugated plate of glass-resin laminate, placing a flat plate of glass-resin laminate on the corrugated plate on the crests thereof, connecting the plates together by welding the lower surface of the flat plate to the upper surface of the crests of the corrugated plate, covering the upper surface of the flat plate with water, and circulating a refrigerant in the channels formed between the two plates to freeze the water.

2. A method as claimed in claim 1 comprising attaching a sub-base of polyurethane foam to the corrugated plate at the lower surface thereof.

3. A method as claimed in claim 2 wherein said polyurethane foam is cast on the lower surface of the corrugated plate, the latter serving as a mold.

4. A method as claimed in claim 1 comprising upfolding the flat plate at the marginal edges thereof to form a container for the water.

References Cited

UNITED STATES PATENTS

| 3,012,596 | 12/1961 | Skulout | 62—235 |
| 3,108,454 | 10/1963 | Rasik | 62—235 |
| 3,174,301 | 3/1965 | Thornton | 165—136 |

WILLIAM J. WYE, Primary Examiner

U.S. Cl. X.R.

62—443, 523; 165—170, 136